UNITED STATES PATENT OFFICE.

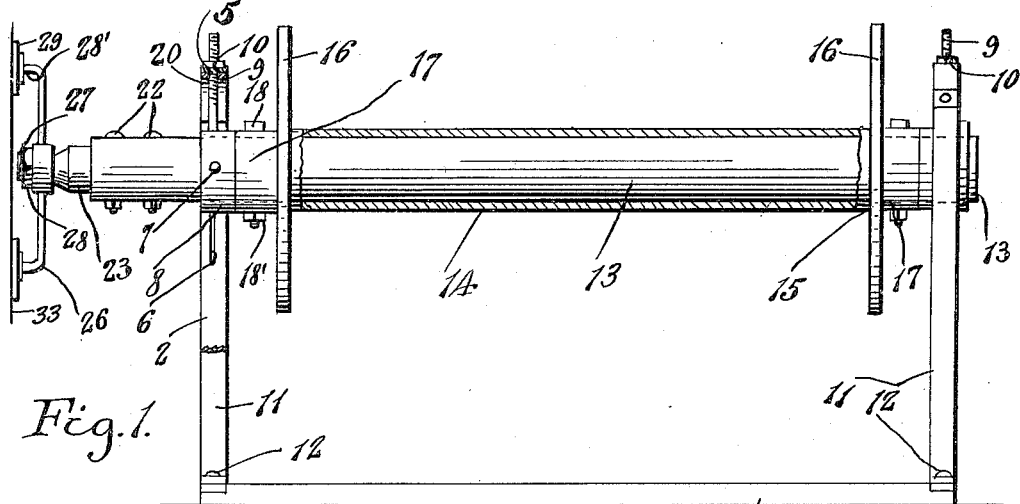

AUGUST E. REBOLD, OF OKMULGEE, OKLAHOMA.

REEL.

1,232,085.  Specification of Letters Patent.  Patented July 3, 1917.

Application filed August 1, 1916.  Serial No. 112,563.

*To all whom it may concern:*

Be it known that I, AUGUST E. REBOLD, a citizen of the United States, residing at Okmulgee, in the county of Okmulgee and State of Oklahoma, have invented certain new and useful Improvements in Reels; and I do hereby declare the following to be a full, clear, and exact description of the invention, such as will enable others skilled in the art to which it appertains to make and use the same.

This invention relates to improvements in wire reels.

The invention has for an object to improve the construction of wire reels, so as to provide a spool supporting shaft which may be easily and quickly placed through a spool for rotation therewith for winding or unwinding line wire.

A further object of this invention is the provision of a base, a wire line spool supporting shaft mounted upon the base and vertically adjustable with relation thereto, and means for connecting the shaft to the fly wheel of a power source for rotating the shaft and spool.

A still further object of this invention is the connection of the spool holding shaft to a power source so as to permit the wire to be kept taut during the winding or unwinding process.

A further object of this invention is to provide a wire reel of this character, which will be simple, practical, and a comparatively inexpensive structure, that will be easily and quickly operated and the winding of the wire kept uniform.

With these and other objects in view the invention consists in the construction, and novel combination and arrangement of parts hereinafter more fully described and pointed out in the claims hereto appended.

In the drawings:

Figure 1 is a side elevation partly in section of my improved wire line spooler, Fig. 2 is an end elevation partly in section, Fig. 3 is an enlarged detail view partly in section showing the shaft attached to the fly wheel of an engine, and Fig. 4 is a detail view of one of the shaft supporting bearings.

Like numerals of reference designate corresponding parts in all the figures of the drawings.

Referring more particularly to the drawings, 1 designates the base which is preferably rectangular in shape, and has secured thereto at its opposite ends the bearing supporting brackets 2. The brackets 2 are substantially inverted U-shaped and have the ends of their legs bent angularly in opposite directions to form supporting feet 3, which feet are secured to the upper face of the base at opposite ends thereof centrally between the longitudinal side edges by suitable bolts 4, or other fastening means.

The webs of the U-shaped members 2 are each provided with central openings 5 and the legs have vertical slots therein the purpose of which will be hereinafter more fully described.

The slots 6 are adapted to slidably receive the lugs 7 formed on the outer periphery of the circular bearing base at diametrically opposite points which lugs prevent lateral movement of the bearings in the slots. A screw threaded shank 9 is formed on the periphery of the circular bearing members 8 and located centrally between the lugs 7, which screw threaded shank is adapted to extend up through and beyond the web of the U-shaped members 2, a nut 10 is fitted on the shank 9 and bears against the outer face of the web of the brackets facilitating the vertical adjustment of the bearings with relation to the base, and the lugs 7 preventing lateral movement during the sliding movement of these bearings.

The brackets 2 are rigidly supported upon the base 1 by the brace rods 11 which have their ends bent angularly, one of which is secured to the base 1 in the opposite corners thereof, and their opposite ends secured to the outer faces of the legs of the U-shaped brackets near the web portion by any suitable fastening means 12 and 12′.

A spool supporting shaft 13 is removably and rotatably mounted in the bearings 8, and has one of its ends projecting for a considerable distance beyond one of the supporting brackets as at 13′. Removably mounted upon the shaft 13 for rotation therewith is a wire line spool 15, which spool has flanges 16. Arranged at spaced distances apart, and formed centrally of the flanges 16 are the bearing hubs 17, which hubs rotatably receive the shaft 13, and therefore abut the inner faces of the bearings 8 to limit the outward movement of the shaft 13. A bolt 18 extends through one of the hubs 17 and through the shaft 13, and a nut 18' is fitted on the end of the bolt to hold the spool 15 against independent rotation upon the shaft 13.

A pair of U-shaped members 20 are secured by the ends of their legs to the legs of the first named U-shaped members, their webs provided with openings alining with the openings in the webs of the first named members, which second named members reinforce the construction of the first named members.

The end 13' of the shaft 13 is provided with an inwardly extending recess the walls of which are provided with spaced bolt receiving apertures 21, through which are adapted to extend bolts 22 having on their lower ends the nuts 22' for holding the clamp bolt 23 therein. The inner end of the bolt 23 is provided with bolt receiving apertures 25 adapted to aline with the apertures in the walls of the recess 20 and receive the bolts 22 therethrough for holding the clamp bolt against movement and permit the same to rotate with the shaft. Mounted upon the squared end of the clamp bolt 23 is a U-shaped clamp member 26, the web of which is provided with a central squared rectangular aperture 27, which snugly fits the squared end 24 of the clamp bolt 23 to prevent independent rotation of the clamp member thereon. The extreme outer end of the clamp bolt 23 is circular as at 27, and provided with screw threads 28 on which is fitted a nut 29 to hold the clamp against any lateral movement. The arms 28' of the U-shaped clamp are provided with stationary flanges 29, which are formed near the outer ends of said arms 28. The extreme ends of the arms 28' are screw threaded as at 30 to receive nuts 31, which hold the removable flanges 32 against outward movement. The flanges 29 and 31 facilitate the quick attachment of the clamp to the fly wheel 33 of any suitable type of engine, (not shown).

In the operation of this invention, the shaft is first withdrawn from the bearings 8 carried by the brackets 2. The line wire spool is then placed between the brackets 2, and the hubs of which aline with the bearings, the shaft is then passed through the bearings and the spool and the bolt passed through the hub of the spool and through the shaft to hold the spool against independent rotation with relation to the shaft, the clamp carried by the clamp bolt is then secured to the fly wheel of an engine and the rotation of the spool and the shaft is assured. It is obvious that the hubs 17 of the spool prevent any lateral movement of the spool when assembled. It will be understood by referring to the drawings that the bearings are vertically adjustable within the brackets to permit the bearings to be raised or lowered thus raising or adjusting the spool carrying shaft and facilitate the winding of wire thereon, which wire is to be wound uniformly upon the spool. It also permits the spool to be lowered or raised depending upon the height of the wire to be wound upon the spool. It can be stated that the engine or power applying mechanism can be used to keep the wire taut at all times during the winding or unwinding process.

It is understood that various changes in form, and minor details of construction may be resorted to without departing from the spirit or sacrificing any of the advantages claimed in this invention.

What is claimed is:

1. A device of the class described comprising a supporting base, a pair of inverted U-shaped brackets mounted on the upper face of the base at the opposite ends thereof, bearings vertically adjustable within the brackets, means extending through the web of the brackets formed integrally with the bearings for holding the same in their adjusted position, a shaft rotatably and removably journaled in the bearings, means at one end of the shaft for detachably connecting the shaft to a power source for rotating the same, a spool rotatably and removably mounted on the shaft for rotation therewith, and means carried by the shaft and engaging the spool for preventing lateral movement of the spool in either direction.

2. A device of the class described comprising a rectangular supporting base, a pair of inverted U-shaped brackets mounted upon the base at opposite ends thereof, bearings slidably mounted in each of said brackets, means adjustable through the webs of the brackets and connected to the bearings for holding the bearings vertically adjustably within the brackets, a shaft removably and rotatably journaled within the bearings, means for holding the shaft against longitudinal movement within the bearings, a spool rotatably mounted upon the shaft, means extending through the spool and the shaft for holding the spool rigidly connected with the shaft for rotation therewith, and means detachably carried by one end of the shaft for securing the shaft to a power source for rotating the shaft.

3. A device of the class described comprising a base, U-shaped brackets secured to the upper face of the base, vertical slots in the arms of the brackets, circular bearings provided with lugs slidably mounted in the slots, means carried by the bearings and extending through the webs of the brackets for holding the bearings in adjusted position within the brackets, a shaft journaled in the bearings, a spool mounted upon the shaft, means connecting the spool to the shaft for holding the same for rotation therewith, means carried by the shaft and spool for limiting the movement of the shaft in either direction, means carried by one end of the shaft for connecting the same to a power source for rotating the said shaft.

In testimony whereof I affix my signature in presence of two witnesses.

AUGUST E. REBOLD.

Witnesses:
CHARLES R. RISOR,
A. B. SETTLE.

Copies of this patent may be obtained for five cents each, by addressing the "Commissioner of Patents, Washington, D. C."